United States Patent [19]

Gardner

[11] 4,079,626
[45] Mar. 21, 1978

[54] ELECTROMAGNETIC FLOW METER

[76] Inventor: William L. Gardner, 9818 Etiwanda Ave., Northridge, Calif. 91324

[21] Appl. No.: 702,611

[22] Filed: Jul. 6, 1976

[51] Int. Cl.² .............................................. G01F 1/58
[52] U.S. Cl. ................................. 73/194 EM; 73/181
[58] Field of Search .......................... 73/194 EM, 181

[56] References Cited

U.S. PATENT DOCUMENTS

| 3,308,659 | 3/1967 | Herndon | 73/194 EM |
| 3,400,582 | 9/1968 | Warner | 73/181 |
| 3,487,826 | 1/1970 | Barefoot | 73/194 EM X |
| 3,620,079 | 11/1971 | Nosley | 73/194 EM |
| 3,800,592 | 4/1974 | Jones, Jr. | 73/181 |
| 3,805,768 | 4/1974 | Barefoot et al. | 73/194 EM |
| 3,855,858 | 12/1974 | Cushing | 73/194 EM |
| 3,965,738 | 6/1976 | Watanabe | 73/194 EM |

FOREIGN PATENT DOCUMENTS 1,528,050  4/1968  France ........................... 73/194 EM

OTHER PUBLICATIONS

J. Lubcke, "Inductive Flow Measurement by Flat Measuring Probes", *Automatisierungspraxis*, vol. 12, No. 8, pp. 187–190, August 1975.

*Primary Examiner*—Charles A. Ruehl
*Attorney, Agent, or Firm*—Fulwider, Patton, Rieber, Lee & Utecht

[57] ABSTRACT

An electromagnetic flow meter construction for substantially flush mounting within a surface past which a fluid is to flow. A pair of spaced electrodes in contact with the fluid are mounted along a line perpendicular to the fluid flow and an elongated electromagnet provides magnetic lines of force substantially perpendicular to both the fluid flow and the line of the electrodes to generate an electrical potential between the electrodes proportional to the fluid velocity.

The electrode leads are oriented with respect to the electromagnet to minimize the quadrature voltage and the electromagnet is bifilar wound and utilized in a push-pull alternating current driving circuit. The electrode signals are applied to a synchronous detector to generate a direct current voltage proportional to the fluid velocity.

11 Claims, 9 Drawing Figures

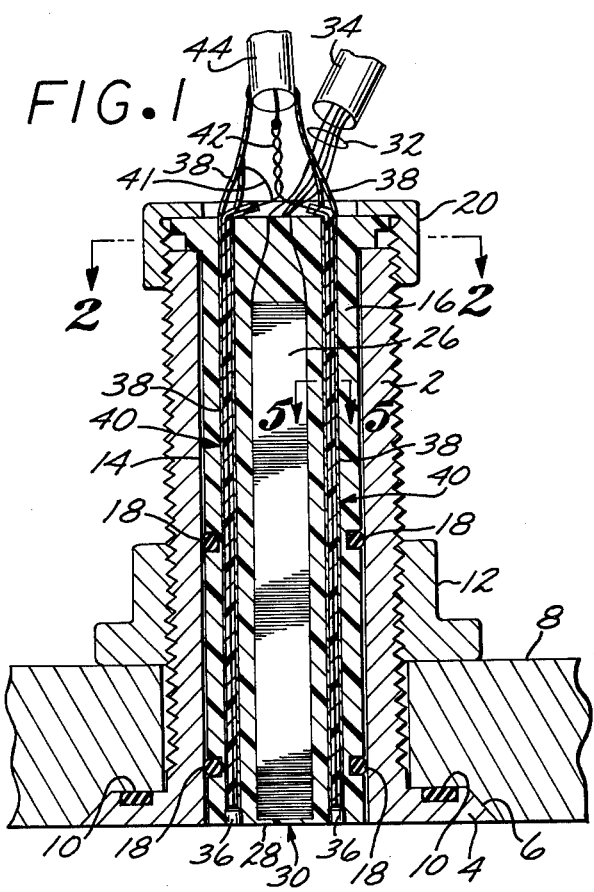
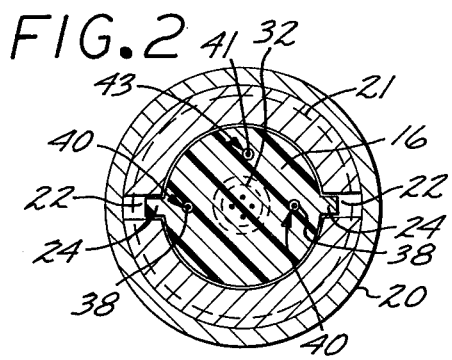
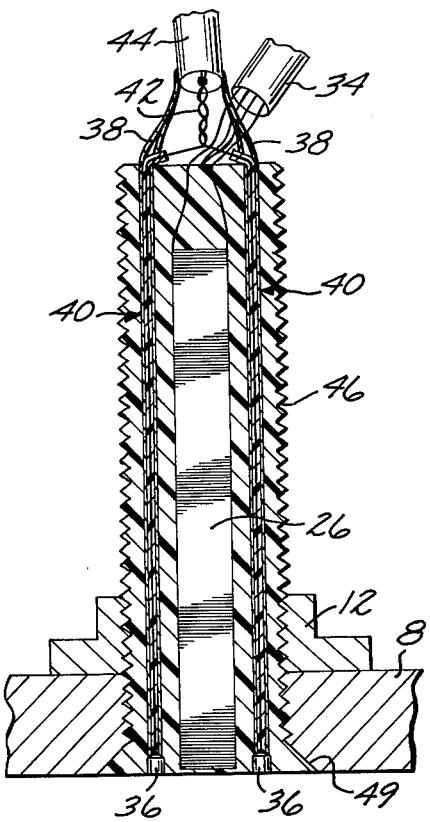
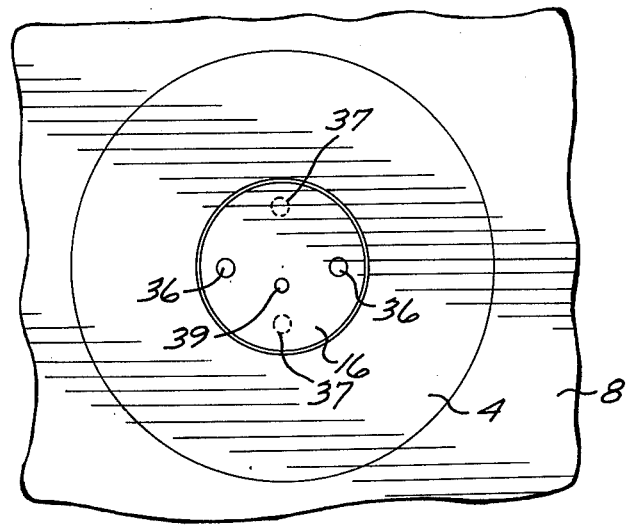
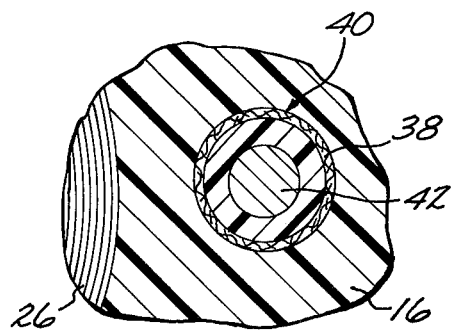

ELECTROMAGNETIC FLOW METER

BACKGROUND OF THE INVENTION

1. Field of the Invention

The present invention relates generally to electromagnetic fluid flow meters and, more particularly, to a flow meter which requires no structure protruding into the fluid flow.

2. Description of the Prior Art

In the development of electromagnetic fluid flow meters, a number of approaches have been taken, all of which are dependent upon the fact that when a pair of electrical contacts are in contact with a flowing fluid and there is a component of an electromagnetic field perpendicular to that flowing fluid, an electrical potential will be generated between the electrodes which is proportional to the velocity of the fluid past the electrodes and to the strength of the magnetic field. The most common configuration for a device for utilizing this physical principle is a "rodmeter" as evidenced by the Snyder et al U.S. Pat. No. 2,969,673 and Springston, Jr. U.S. Pat. No. 3,677,082.

In devices of this type, the electromagnetic field is generated by an electromagnet located in a rod or wand submerged in the field flow itself which, in the case of Snyder and Springston, Jr., is a structure which is suspended below the hull of a marine vessel. The electrodes are mounted on the sides of the rod and are in contact with the water flowing past it. While these devices function adequately, there are problems with the rod structure itself extending beyond the hull of the vessel, a feature particularly undersirable for small sailing vessels.

Another approach which has been taken is to mount the electrodes practically flush with the surface past which the fluid flows and provide a similar electromagnetic field between the electrodes. One prior art approach utilizing this concept is shown in the Kenyon U.S. Pat. No. 3,119,960. In the Kenyon technique, the electromagnetic field is provided by a relatively conventional electromagnet construction which requires special mounting techniques as the overall structure is relatively large.

While the prior art mounting flow meter constructions are adequate for some purposes, the elaborate mounting schemes normally required make them unsuitable for use in vessels such as pleasure craft which require relatively simple installation and maintenance. The flow meter constructure of the present invention provides a long-felt need for an electromagnetic flow meter for such applications.

SUMMARY OF THE INVENTION

The electromagnetic flow meter construction of the present invention provides a flush mounting electromagnetic transducer construction which substantially conforms to conventional transducer mounting configurations and which does not require specialized installation precedures.

In the present preferred embodiment of the invention, a pair of electrodes are mounted in a housing and spaced from each other along a plane which, in operation, is substantially perpendicular to the fluid flow. The contacts of the electrodes are in contact with the fluid and the leads to the contact are maintained substantially parallel in the plane throughout the length of the transducer body. A magnetic field substantially perpendicular to the fluid flow is provided by an electromagnet positioned between the spaced electrodes so that one pole of the magnet is positioned between the electrodes and the axis of the electromagnet is in the same plane as the electrode leads. Uniformity of electromagnetic generation in the preferred embodiment is achieved by bifilar windings on an elongated form and operating the electromagnet in push-pull drive.

While the electromagnetic field may be generated by a current having any desired waveform, in a presently preferred embodiment the waveform is a square wave which saturates the electromagnet core, reducing the necessity for close regulation of the electromagnet driving current as the generated electromagnetic field will be substantially the same regardless of minor variations in driving current. Additionally, the driving currents of the presently preferred embodiment are essentially spaced pulses to reduce the duty cycle of the drive circuitry to conserve power.

In an alternate embodiment, a second pair of contacts are provided in a plane which is substantially parallel to the direction of fluid flow to detect any fluid flow transverse to the assumed direction perpendicular to the first pair of electrodes. The resultant velocity vectors may be processed in any conventional manner to yield any desired parameters which are the result of the two vector quantities.

BRIEF DESCRIPTION OF THE DRAWINGS

FIG. 1 is a cross-sectional view of the electromagnetic velocity transducer housing shown mounted in a conventional through-hull fitting;

FIG. 2 is a cross-sectional view taken in the direction of lines 2—2 of FIG. 1;

FIG. 3 is a bottom view of the hull of a vessel showing the through-hull fitting and the electromagnetic transducer housing fitted therein;

FIG. 4 is a cross-sectional view of an alternate embodiment of the invention in which the transducer housing is permanently mounted;

FIG. 5 is an expanded cross-sectional view taken in the direction of lines 5—5 of FIG. 1;

DESCRIPTION OF THE PREFERRED EMBODIMENTS

Figure 6:
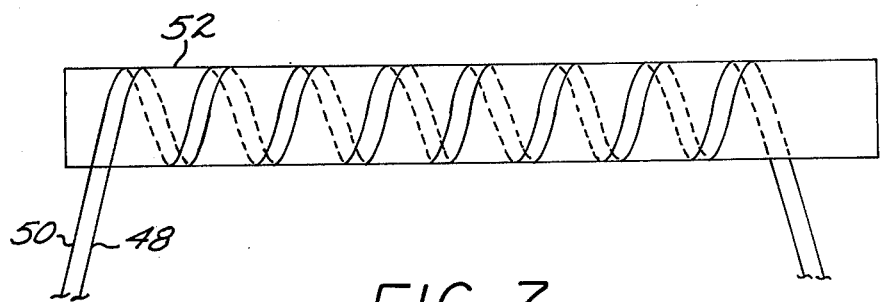
FIG. 6 is a diagrammatic view of the beginning of a bifilar winding for the electromagnet utilized in the flow meter of the present invention.

Turning now to the drawings, and particularly FIG. 1 thereof, a cross-section of a transducer constructed in accordance with the present invention is shown mounted in a conventional through-hull fitting for a marine vessel. In particular, the through-hull fitting includes a cylindrical mounting shell 2 which is threaded on the outside and whose bottom end has a beveled flange 4 which fits into a recess 6 within a hull 8 of a vessel. The beveled flange 4 may be sealed to the hull by any convenient means such as the illustrated O-ring 10. The mounting shell 2 is typically kept in place by means of a retaining nut 12. The mounting shell 2 has a cylindrical transducer receiving bore 14 which, in the absence of an in-place transducer, provides an opening between the inside of the vessel and the water below the hull.

Conventionally, a transducer housing 16 is generally cylindrical in shape and substantially fills the bore 14 when in place. Typically, some means of sealing the bore to the external surface of the transducer housing is employed, such as the O-ring 18. The transducer housing is held in place within the bore 14 by means of a retaining cap 20.

As shown in FIG. 2, the top of the mounting shell 2 and transducer housing 16 have cooperating notches 22 and tabs 24, respectively, to insure proper orientation of the transducer housing with respect to the mounting shell which may be aligned with the longitudinal axis of the vessel.

While the transducer housing 16 may include a velocity transducer of any configuration consistent with the size of the housing, the transducer of the present invention is electromagnetic in nature and, centrally located within the housing is an elongated electromaget 26 having a pole end 28 near the bottom of the housing. However, it should be noted that the electromagnet pole itself is isolated from the water by means of a small section 30 of the housing itself. As will be more fully discussed below, in order to simplify the construction of the transducer, the leads to the elctromagnet 26 are all terminated at the upper portion of the electromagnet and are centrally led through a plurality of electrical conductors 32 to a shielded cable 34 which is connected to the electromaget coil driver discussed below.

The sensing electrodes 36 which interact with the electromagnetic field generated by the electromagnet 26 and the moving water are located at the bottom of the housing 16 and are in contact with the water. The electrodes 36 are symmetrically placed on each side of the electromagnet 26 while the mounting shell 2 and transducer are oriented so that the velocity of the water flowing past the vessel flows generally perpendicular to a line intersecting the electrodes 36. In addition, a balancing ground electrode 39 is placed at the bottom of the housing 16, also in contact with the water (FIG. 3).

FIG. 3 illustrates the placement of a second set of in-line electrodes 37 which are aligned with the direction of fluid flow. These electrodes may be used to sense leeway or sideways motion and velocity and operate in substantially the same manner as electrodes 36.

In order to prevent quadrature or transformer coupling of the electromagnetic field of the electromagnet 26 to the leads 42 to the electrodes, the leads are placed in bores 40 which are symmetrically oriented and parallel to the bore containing the electromagnet 26. To reduce interference in the electrode circuits, the electrode leads 42 are placed in shielded cables with the shields 38 being commonly connected to the shield of a two-wire shielded cable, the electrode leads 42 being then connected through the two-wire shielded cable 44 to the measuring circuitry to be described below. The orientation of the shielded electrode cables is illustrated in FIG. 5 which shows the general orientation of the cable with respect to the electromagnet 26. The ground electrode 39 need not be shielded and is simply connected by means of a ground lead 41 brought through a bore 43 to the shields 38 at the top of the housing.

FIG. 4 illustrates an alternate embodiment of the mounting arrangement for the electromagnetic transducer of the invention. In some applications, the transducer itself need not be removable from the hull of the vessel, in which case an alternate transducer housing 46 may be utilized which is directly mounted in the hull 8 in a recess 49 held in place by a retaining nut 12. Again, the orientation of the electromagnet 26 and the electrodes 36 and leads 42 remain the same as described above.

Figure 7:
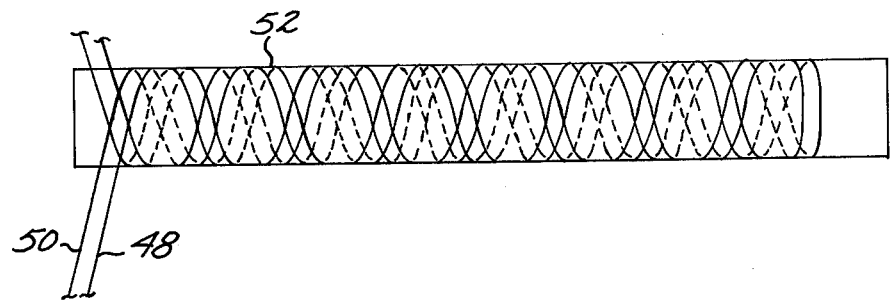
FIG. 7 is another diagrammatic view of an additional reverse winding of the electromagnet construction shown in FIG. 6.

In the present preferred embodiment of the invention, it was found that the electromagnets could best be driven in a push-pull circuit configuration, which, however, required a center-tapped electromagnet coil. In order to provide uniform electromagnetic characteristics of each side of the tapped coil, and still provide that all of the leads to the coil exit at the top of the transducer housing 16, the coil is bifilar wound such as illustrated in FIGS. 6 and 7. To diagrammatically illustrate this electromagnet coil configuration, parallel leads 48 and 50 are commonly wound at the same time around the electromagnet core 52, first all the way down the length of the core 52 as shown in FIG. 6 and then doubled back to the beginning as shown in FIG. 7. This coil winding configuration provides two substantially identical windings on the core 52 and a lead from each of the windings may be tied together to form the center tab for the push-pull driving circuit. The leads are selected so that the electromagnetic field generated by the coil reverses for each half of the push-pull drive arrangement to prevent the well-known polarization problem of the elctrodes 36 during the operation of the sensing technique.

As discussed above, the velocity sensing system of the present invention may be operated in an intermittent, low duty cycle configuration and, the overall operation of the sensing circuitry should therefore not be operative unless the electromagnetic field is present. Therefore, a synchronous detection system is utilized for measurement in which the signal developed across the electrodes 36 is not processed unless the elctromagnetic lines of force due to the actual driving field are present. Therefore, as shown in the signal processing circuitry in FIG. 8, the electrical signal across electrodes 36 are led through leads 42 to the opposite inputs of differential amplifier 54 which has an extremely high input impedance. The high input impedance, and subsequent minimal loading allows the system to be utilized in fresh as well as salt water, which have different conductivities. Therefore, it is only the voltage across the electrodes 36 due to the motion of the water through the electromagnetic field which influences the amplifier operation, and is substantially independent of the electric current which passes between the electrodes.

The output of differential amplifier 54 on line 56 is connected to one input of a synchronous detector 58 and another input on line 60 to the synchronous detector is derived from the signal which generates the electromagnetic field. Therefore, the two signals which arrive at the synchronous detector 58 are time-restricted to when the electromagnetic field is being created by the coil — driving signal.

The output of the synchronous detector 58 on line 62 is a direct current voltage which is directly proportional to the electropotential generated between the electrodes 36 due to the interaction of the electromagnetic field and the moving water. Therefore, the direct current signal on line 62 is directly proportional to the velocity of the water or the velocity of the vessel. Using available circuit components, the direct current signal on line 62 is usually of low amplitude and is connected to an amplifier 64 which has an output on line 66 which is connected through a calibrating resistor 68 to a line 70 which is in turn connected to a velocity reading meter 72.

In accordance with standard practice, the velocity reading meter 72 may read various ranges of velocity which may be controlled by means of a scale expansion signal connected through line 74 to the amplifier 64.

It will be appreciated that whenever a velocity signal is present, it may be integrated to provide a distance signal. Therefore, as shown by phantom line 76, the velocity signal on line 70 may be connected to an integrator 78 which then develops a signal on line 80 connected to a log readout 82 which indicates the distance traveled based on the velocity signal on line 70.

The coil driving signal utilized in the velocity measuring system of the present invention is basically derived from an oscillator 84 which may generate any desired wave shape, depending on the application. It is contemplated that the oscillator 84 generally develop square waves in order that the electromagnet be saturated to eliminate the necessity of close current regulation in the electromagnet 26. It is also contemplated that the oscillator 84 generate short-duration, pulsed signals with a relatively long time between signals to decrease the duty cycle of the overall system in order to reduce power drain.

The oscillator 84 generates a coil-driving signal on line 86 which is connected to a coil drive circuit 88 which is basically a power amplifier designed to drive the electromagnet 26 in a push-pull circuit, generally illustrated by the two outer leads 90 and 92 and the center tap 94.

As the overall operation of the synchronous detector 58 is dependent upon the levels of the signals coming from the electrode amplifier 54 and the coil drive signal from the coil drive 88, a coil drive signal on a line 100 is connected through a detector drive amplifier 102 to the line 60 which supplies the synchronous coil drive signal to be utilized with the electrode signals on line 56 in the synchronous detector 58.

Figure 8:
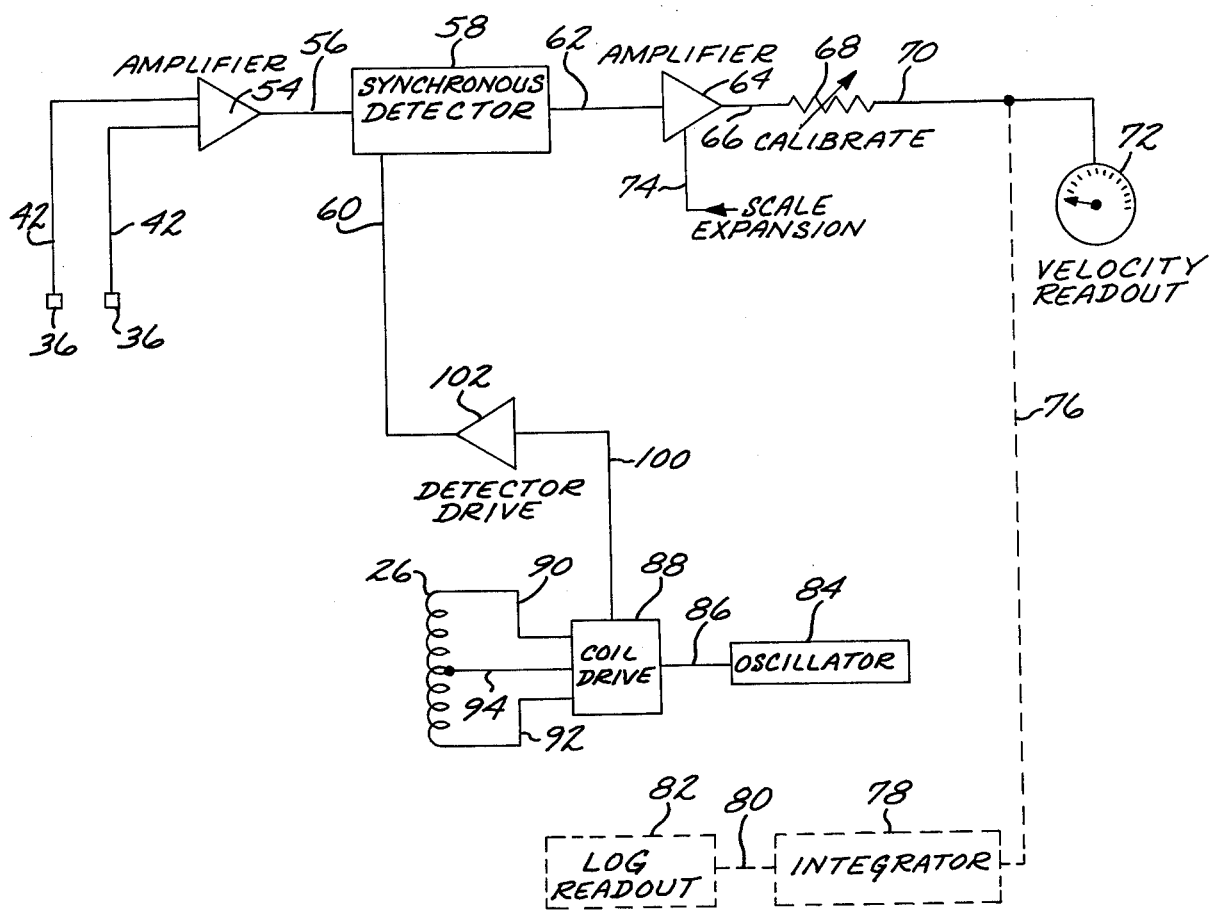
FIG. 8 is a block diagram of the electrical circuitry required to generate a velocity signal from the electropotential developed across the electrodes of the transducer utilized in the present invention.
Figure 9:
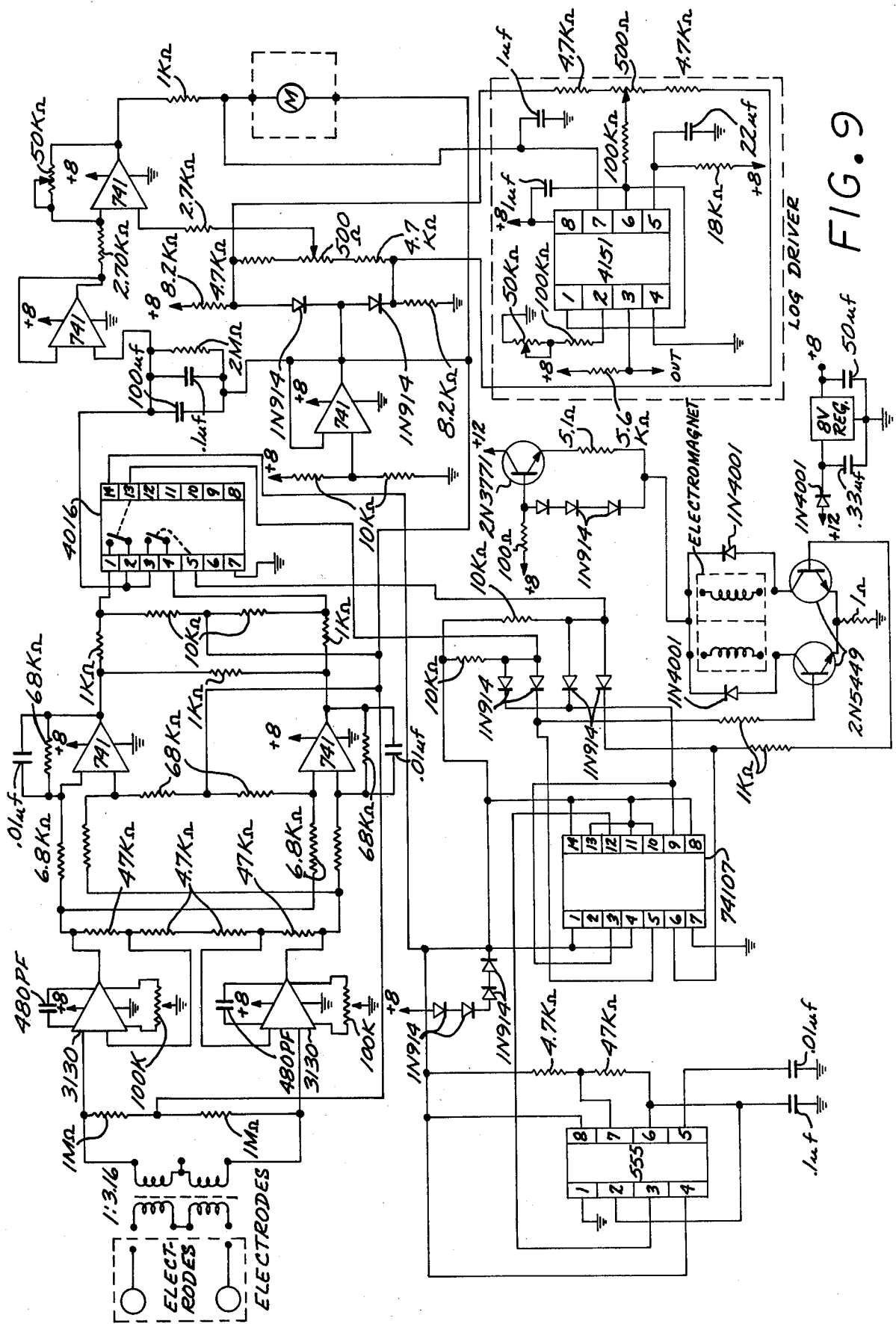
FIG. 9 is an electrical schematic diagram of the electrical circuitry utilized in the presently preferred embodiment of the invention.

While the block diagram shown in FIG. 8 illustrates the basic operation of the signal processing circuitry of the velocity sensor of the present invention, the actual schematic diagram of a circuit utilized in the presently preferred embodiment of the invention is shown in FIG. 9. The circuitry is constructed utilizing conventionally available components as clearly labeled on the diagram.

While a particular presently preferred embodiment of the velocity sensor of the present invention has been described in detail above, it should be appreciated that numerous other configurations utilizing the principles of the invention may be constructed. Therefore, the invention is not to be limited except by the following claims.

I claim:

1. A fluid flow meter transducer, comprising:
   an electromagnet having an axis substantially perpendicular to the direction of fluid flow and an end pole piece substantially adjacent to, but isolated from, the fluid, said electromagnet being elongated and includes a bifilar winding having winding conductors which terminate at a pole piece opposite that which is substantially adjacent to said fluid;
   a pair of electrodes mounted adjacent the end pole piece and in contact with the fluid, the direction of fluid flow between said electrodes being substantially perpendicular to a line between said electrodes; and
   a pair of conductors leading from said electrodes, said conductors being substantially parallel to said axis of said electromagnet and substantially equidistant therefrom adjacent said electromagnet.

2. A fluid flow meter transducer construction as defined in claim 1, including:
   driving means for providing a driving signal to said electromagnet for push-pull driving of said bifilar winding of said electromagnet with a substantially square waveform, said driving signal being of relatively short duration compared to the time between each driving signal, and said driving signal driving said electromagnet into saturation.

3. A fluid flow meter, comprising:
   a housing having an axis substantially perpendicular to a surface along which fluid flows, said housing having an end surface substantially flush with said surface along which fluid flows;
   an elongated electromagnet mounted in said housing, the axis of said electromagnet being substantially parallel to said axis of said housing, said axis of said electromagnet being substantially perpendicular to said surface along which fluid flows, said electromagnet having an end pole piece substantially adjacent said surface along which fluid flows, but isolated therefrom;
   a pair of electrodes mounted in said end surface of said housing and in contact with said fluid, the direction of fluid flow being substantially perpendicular to a line between said electrodes;
   a pair of electrode conductors leading from said electrodes to an opposite end surface of said housing, said conductors being substantially parallel to said axis of said electromagnet and equidistant therefrom adjacent said electromagnet;
   driving means for providing a driving signal to said electromagnet whereby an electromagnetic field is generated in said fluid around said electrodes when said driving signal is applied to said electromagnet; and
   sensing means for sensing the electropotential generated between said electrodes resulting from the interaction of said electromagnetic field and the flow of said fluid, said sensing means generating a velocity signal substantially proportional to the velocity of said fluid flow.

4. A fluid flow meter as defined in claim 3, wherein:
   said driving signal has a substantially square waveform, said driving signal being of relatively short duration compared to the time between each driving signal and said driving signal driving said electromagnet into saturation.

5. A fluid flow meter as defined in claim 4, wherein:
   said electromagnet is bifilar wound and has connecting conductors terminating at said opposite end surface of said housing and connected as a center-tapped coil; and
   said driving signal is connected to said connecting conductors for push-pull driving of said center-tapped coil of said bifilar wound electromagnet.

6. A fluid flow meter as defined in claim 4, wherein:
   said housing includes a fixed portion for substantially fixed mounting with said surface along which fluid flows and a removable portion containing said electromagnet, said electrodes and said electrode conductors.

7. A fluid flow meter as defined in claim 3, wherein: said sensing means includes amplifier means connected to said electrode conductors, said amplifier means having a substantially high input impedance, said sensing means further including a synchronous detector connected to the output signal of said amplifier means and connected to said driving signal for comparison of said signals to derive a velocity signal therefrom, said velocity signal being substantially proportional to the velocity of said fluid along said surface.

8. A fluid flow meter as defined in claim 7, wherein: said driving signal has a substantially square waveform, said driving signal being of relatively short duration compared to the time between each driving signal.

9. A fluid flow meter as defined in claim 8, wherein: said electromagnet is bifilar wound and has connecting conductors terminating at said opposite end surface of said housing and connected as a center-tapped coil; and said driving signal is connected to said connecting conductor for push-pull driving of said center tapped coil of said bifilar wound electromagnet.

10. A fluid flow meter as defined in claim 9, wherein: said housing includes a fixed portion for substantially fixed mounting with said surface along which fluid flows and a removable portion containing said electromagnet, said electrodes and said electrode conductors.

11. A fluid flow meter transducer, comprising:

an electromagnet having an axis substantially perpendicular to the direction of fluid flow and an end pole piece substantially adjacent to but isolated from the fluid;

a pair of electrodes mounted adjacent the end pole piece and in contact with the fluid, the direction of fluid flow between said electrodes being substantially perpendicular to a line between said electrodes, said line between said electrodes being perpendicular to said axis of said electromagnet;

a pair of conductors leading from said electrodes, said conductors being substantially parallel to said axis of said electromagnet and substantially equidistant therefrom adjacent said electromagnet; and driving means for providing a driving signal to said electromagnet whereby an electromagnetic field is substantially generated in said fluid around said electrode when said driving signal is applied to said electromagnet, said driving signal having a substantially square waveform and is of relatively short duration compared to the time between each driving signal, the application of said driving signal to said electromagnet driving said electromagnet into saturation.

* * * * *